April 28, 1931. A. J. THOMPSON 1,802,589
SHOCK ABSORBER FOR LIGHTING UNITS
Filed Oct. 24, 1927
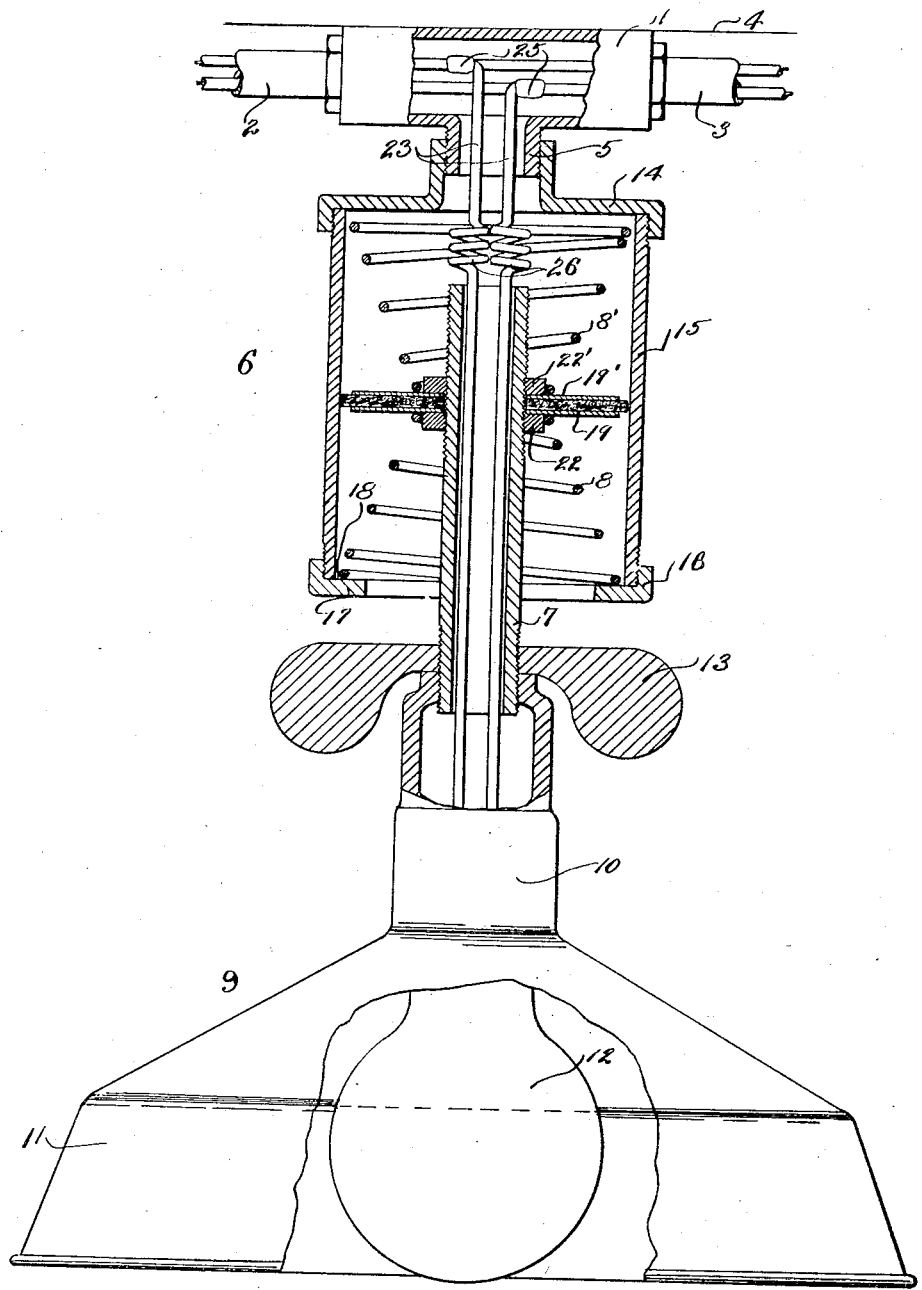
Inventor
Allison J. Thompson
By Brockett & Hyde
Attorneys Patented Apr. 28, 1931

1,802,589

UNITED STATES PATENT OFFICE

ALLISON J. THOMPSON, OF CLEVELAND, OHIO

SHOCK ABSORBER FOR LIGHTING UNITS

Application filed October 24, 1927. Serial No. 228,262.

This invention relates to shock absorbers for lighting units, adapted one each for arrangement in supporting relation with a corresponding luminair for the purpose of protecting the luminair, and more particularly the filament of the lamp thereof, from the destructive vibration and shock which might be transmitted thereto were the support rigid.

I am aware that it is not new in the art to provide for the purpose merely a resilient element in the luminair supporting means. My invention therefore relates more specifically to the particular form and arrangement of such an element and includes, to the end of improving the efficiency of the shock absorber, means therein for absorbing what might be considered rebound forces, as distinguished from direct forces; and further, damper means as distinguished from merely resilient means, for absorbing minute vibrational forces which, though immeasurably small, yet greatly reduce filament life. Another object of the invention, and working toward the same ends, is to provide means for weighting the luminair sufficiently to render the same substantially non-responsive to vibrations below those of a certain frequency or amplitude. Still another object of the invention is to provide a structure which will function for the described purposes efficiently under all conditions and at the same time be of the utmost simplicity.

The exact nature of the invention, together with further objects and advantages, will be apparent from the following description taken in connection with the accompanying drawing which is an assembly view showing a complete luminair installation, parts being in section to show details of construction.

In the installation chosen for illustration, the principal parts are a conduit outlet box fixture 1 in connection with line conduits 2 and 3 and firmly secured in any convenient manner as with the ceiling 4 and provided with a downwardly extending outlet opening portion 5; a shock absorber generally designated by the reference numeral 6 to be described in detail, and having a tubular stem 7 supported on a spring 8; a luminair generally designated by the reference numeral 9 and comprising a holder portion 10 having a lamp 12 secured in the usual manner in a socket within the holder 10 and customarily an integral reflector portion 11; and an inertia member 13 attached in rigid relation with the luminair.

Of the four princpal parts of the installation described, the conduit outlet box and the luminair are of standard construction and need no further description; and it is apparent that should the shock absorber 6 and inertia member 13 be dispensed with, any shocks, jars or vibrations to which the outlet box were subjected would be transmitted directly to the lamp.

According to my invention, however, the shock absorber and inertia units are placed as indicated between the outlet box and the luminair, whereby the luminair, although still supported from the outlet box, will be completely insulated therefrom as to any of the usual destructive forces to which it might otherwise be subjected.

The shock absorber unit 6 includes a casing comprising a cap member 14 in threaded relation with the outlet portion of the box 1, a cylindrical body member 15 in threaded relation with the cap 14, and a flange member 16 in threaded relation with the body member 15 at the lower extremity thereof, the flange member 16 being generally of the ring shape indicated, provided with an inwardly extending flange portion 17 whereby shoulder 18 is formed about and inwardly of the lower extremity of the body member 15.

Within the closure formed by the shock absorber casing are a pair of springs 8, 8' each of the conical or tapering helical form indicated, and arranged with their longer ends outward of each other, the lower terminating convolution of the spring 8 seating within the shoulder 18 and the upper terminating convolution of the spirng 8' being firmly positioned by the body member 15 against lateral movement. The stem 7 is threaded for a considerable distance along its upper end, which is arranged to be supported by the spring 8 at the apex portion thereof as will appear. Seating between the springs are a pair of circular metallic washers 19, 19' extending outwardly as indicated adjacent to but well clearing the inner surface of the body member 15, and seating between the washers and extending preferably to lightly contacting relation with the body member surface is a thick buffer washer of relatively soft yieldable material such as felt, leather or the like. Turned upon the stem 7 one to abut each washer 19 and thus to fix between them the location of all the washers on the stem is a pair of nuts 22, 22'; the stem 7 projecting well above the upper nut 22' and thus within the upper spring 8' to serve as a pilot to prevent the spring becoming ineffective should its lower portion by any chance leave its normal position about the nut 22', it being apparent that the diameter of each spring 8, 8' at its apex portion is such that the spring will fit about one of the nuts 22 and in abutting relation with the corresponding washer 19.

The lower extremity of the stem 7 is in threaded relation, as indicated, with the holder portion 10 of the luminair. Threaded upon the stem 7 immediately above the holder 10, however, is the inertia member 13, generally of doughnut shape, and turned down upon the stem against the holder portion to serve as a lock nut in maintaining a rigid relation between the adjacent parts. The member 13 is cast of heavy metal and its dimensions are such that the addition of its weight to the luminair will render the natural period of vibration of the adjacent assembled parts, as a whole, considerably greater than the frequency of any ordinary periodic vibrations in adjacent parts of the building, such as those resulting from operation of machinery located on the floor above the ceiling 4.

The opening in the member 16 is very considerably greater than the outer dimensions in section of the stem 7, so that the stem and luminair assembly may swing, supported by the spring 8, throughout a wide angle in any direction, and the clearance between the members 13 and 16 is sufficient to allow such swing.

The spring 8, supporting in compression the weight of the stem 7 and parts secured therewith, is of sufficient strength to float the luminair and normally maintain the upper extremity of the spring 8', which is preferably identical with spring 8, somewhat clear of abutting relation with the cap member 14.

The usual pair of leads 23 are tapped upon the line wires 24 passing through the conduit box 1, as at 25, and are led directly downwards through the parts as indicated to suitable connection with the lamp socket, the usual pigtail turns 26 being provided and located within the turns of the upper spring 8'.

It will be obvious form the above that the arrangement presented will serve to effectively insulate the luminair from practically any shock to which the outlet box might be subjected. Assuming the parts normally in a state of rest in the relative positions indicated in the drawing, should the outlet box 1 be subjected to a relatively great vertical shock, as should a heavy object be dropped upon the floor above the ceiling 4, slight downward motion might be imparted to the casing members 14, 15 and 16 of the shock absorber. However, owing to the weight of the luminair and particularly that of the inertia member 13, resulting downward motion of the luminair will lag considerably behind that of the shock absorber frame, the lower spring 8 will expand instantaneously and, if sufficiently, the upper spring 8' would be slightly compressed for an instant and, the upper and lower springs acting against each other, each in rebound of the other, only gentle and relatively slight motion will be imparted to the luminair.

Similarly, any relatively large lateral shock upon the outlet box would result only in a slight gentle swinging motion of the luminair.

Slight periodic vibrations imparted to the outlet box, while the springs might not be flexed thereby, will be largely damped out by the buffer washer 20, in compression between the washers 19, and bearing at least through some part of its periphery against the member 15 to act as a damper or drag thereagainst.

It will be noted that the diameter of the washers 19, 19' is greater than that of the opening within the member 16, so that should breakage occur in the lower spring 8, the stem 7 would drop no farther than the normal distance between the washers 19, 19' and the flange of the member 16.

What I claim is:

1. A lamp hanger installation, comprising a luminair, said luminair consisting of a holder for an incandescent lamp and a reflector for said lamp, means arranged to yieldably support the luminair, and relatively heavy means rigidly associated with said luminair to increase the effective mass thereof, whereby the luminair will be substantially unaffected by impulses too minute to be absorbed by said supporting means.

2. In a lamp hanger installation, a pair of members one extending within the other, resilient means associated therebetween whereby one of said members is yieldably supported from the other for vertical and swinging movement, said supported member being adapted to support a luminair, and buffer means carried by the portion of the inner of said members extending within the outer member, and adapted to bear against the outer member to locate the center of said swinging movement and to dampen said movements of the luminair supporting member.

3. In combination with a dependent spring-supported stem and a luminair threaded thereupon for support, an inertia element comprising a relatively heavy ring portion, with a relatively thin web portion having a central opening screw-threaded upon said stem, said inertia element being turned on said stem to lock against the luminair.

In testimony whereof I hereby affix my signature.

ALLISON J. THOMPSON.